United States Patent
Tidow et al.

(10) Patent No.: US 7,530,196 B2
(45) Date of Patent: May 12, 2009

(54) METHOD FOR IMPROVING PLANT GROWTH BY APPLICATION OF A MIXTURE OF SULFUR AND COMPLEXING AGENT

(75) Inventors: Jörn Tidow, Schwetzingen (DE); Herbert Scholz, Neustadt (DE); Adolf Parg, Bad Dürkheim (DE); Reinhold Stadler, Kirrweiler (DE); Karl-Heinrich Schneider, Kleinkarlbach (DE); Reinhardt Hähndel, Limburgerhof (DE); Gerhard Pompejus, Neustadt (DE); Francesc Riera Forcades, Barcelona (ES)

(73) Assignee: BASF Aktiengesellschaft (DE)

( * ) Notice: Subject to any disclaimer, the term of this patent is extended or adjusted under 35 U.S.C. 154(b) by 941 days.

(21) Appl. No.: 10/499,437

(22) PCT Filed: Jul. 31, 2002

(86) PCT No.: PCT/EP02/08501

§ 371 (c)(1),
(2), (4) Date: Jun. 21, 2004

(87) PCT Pub. No.: WO03/053883

PCT Pub. Date: Jul. 3, 2003

(65) Prior Publication Data

US 2005/0076686 A1    Apr. 14, 2005

(30) Foreign Application Priority Data

Dec. 20, 2001   (DE) ................. 101 63 079

(51) Int. Cl.
  C05D 9/00    (2006.01)
  C05D 9/02    (2006.01)
  A01G 29/00   (2006.01)
(52) U.S. Cl. .................. 47/48.5; 71/31; 71/64.1
(58) Field of Classification Search ............ 71/31, 71/48, 64.1; 47/48.5; 239/1, 542
See application file for complete search history.

(56) References Cited

U.S. PATENT DOCUMENTS

| 2,683,658 | A | 7/1954 | Saunders et al. | |
| 4,676,821 | A | 6/1987 | Gullett et al. | |
| 6,783,567 | B1 * | 8/2004 | Waters et al. | 71/24 |
| 6,841,519 | B1 | 1/2005 | Nakatani et al. | |
| 6,858,058 | B2 * | 2/2005 | Daniels | 71/64.1 |
| 7,238,689 | B2 | 7/2007 | Nakatani et al. | |
| 2004/0259734 | A1 | 12/2004 | Nakatani et al. | |
| 2005/0215797 | A1 | 9/2005 | Nakatani et al. | |
| 2005/0241354 | A1 * | 11/2005 | Wommack et al. | 71/31 |
| 2005/0256004 | A1 | 11/2005 | Takahashi et al. | |

FOREIGN PATENT DOCUMENTS

| DE | 198 28 483 | 6/1997 |
| GB | 2292140 A | 2/1996 |
| JP | 09/328483 A | 6/1996 |
| JP | 2004/002324 A | 1/2004 |
| JP | 2005/035924 A | 2/2005 |
| WO | WO 01/35747 A2 | 5/2001 |
| WO | 01/66493 A2 * | 9/2001 |
| WO | WO 01/83459 A2 | 11/2001 |
| WO | WO 01/83459 A3 | 11/2001 |
| WO | WO 03/010165 A1 | 2/2003 |
| WO | WO 03/0324221 A1 | 3/2003 |
| WO | WO 2004/080183 A1 | 9/2004 |

OTHER PUBLICATIONS

Farm Chemical Handbook 2000, vol. 86, Meister Publishing Co., 2000, Table of Contents (3 pgs).
B. Hock et al., Suttgart 1995, "Herbizide", pp. 1-8.
W. H. Aherns, Herbicide Handbook, 7$^{th}$ Edition, Weed Science Society of America, 1994, Table of Contents (4 pgs.).
K. K. Hatzios, Herbicide Handbook, Supplement to 7$^{th}$ Edition, Weed Science Society of America 1998, Table of Contents (4 pgs.).
S. R. Colby (1967), "Calculating synergistic and antagonistic responses of herbicide combinations", Weeds 15, pp. 20-22.
Dictionary of Chemistry, 9$^{th}$ Edition, vol. 3, Georg-Thieme-Verlag, Stuttgart, New York 1990, p. 2511.
CIPAC Handbook F., p. 420, Dry Sieve Analysis of Waterdispersible Granules, 1995.
Arid zone irrigation, 1973, Springer-Verlag; pp. 303-353.
CIPAC Handbook F., p. 425-429, MT 171 Dustiness of Granular Products.

* cited by examiner

*Primary Examiner*—Wayne Langel
(74) *Attorney, Agent, or Firm*—Rothwell, Figg, Ernst & Manbeck, p.c.

(57) ABSTRACT

Method for improving plant growth by application of a mixture M comprising a component a) of a1) 20 to 96% by weight of sulfur, a2) 4 to 80% by weight of a complexing agent and, if appropriate, one or more crop protectants b) and/or additives c).

17 Claims, No Drawings

METHOD FOR IMPROVING PLANT GROWTH BY APPLICATION OF A MIXTURE OF SULFUR AND COMPLEXING AGENT

CROSS REFERENCE TO RELATED APPLICATION

This application is a 35 USC § 371 National Phase Entry Application from PCT/EP02/08501, filed Jul. 31, 2002, and designating the U.S.

The present invention relates to a method for improving plant growth by application of a mixture M comprising a component a) of a1) 20 to 96% by weight of sulfur, a2) 4 to 80% by weight of a complexing agent and, if appropriate, one or more crop protection agents b) and/or further additives c); to the use of a polymeric cation complexing agent a2) for the preparation of a mixture comprising elemental sulfur for using this mixture as means for improving plant growth and to the use of a mixture M as means for improving plant growth, to an irrigation system encompassing A) a storage container filled with a mixture M, B) if appropriate a pump, C) a pipeline system which is connected to the storage container at the inlet position and which supplies one or more D) trickle systems and/or sprinklers at the outlet position(s), and to plantations encompassing useful plants and/or ornamentals, the soil and/or the substrate and the irrigation system as claimed as essential components.

Mixtures of sulfur with a variety of auxiliaries are known in the field of agriculture as fungicides or acaricides and commercially available for example as the product KUMULUS® from BASF Aktiengesellschaft.

However, the use of mixtures of elemental sulfur and complexing agents for improving plant growth is not known.

The use of lignosulfonate gel for soil conditioning is known from DE 198 28 483 A1, and the use of lignosulfonates in crop protection is known from WO 01/35747 A2.

What is known as trickle irrigation is extensively used for irrigating crop plants, for example, useful plants and/or ornamentals. In this system, nozzles which are supplied by a tank via a pipeline spray the nutrients and/or crop protectants, in general in aqueous solution, dispersion or suspension, into the vicinity of the plant roots. The nutrients and/or crop protectants are advantageously preblended in a storage tank which supplies the pipeline or spray nozzles. The leaves of the plants under cultivation do not come into contact with the nutrient and/or crop protectant solution in this method.

Trickle irrigation is frequently applied to alkaline soils or volcanic soils. Alkaline soils have the disadvantage that many plants do not grow well on them; according to current knowledge, the relatively high soil pH (approx. 8 and more, that is to say alkaline) causes the plant nutrients to be trapped in the soil; they can therefore not be taken up by the plant.

The supply of nutrients can be increased for example using zinc and iron chelates. Apart from the costs involved, the disadvantage of this method is that it leads to salinization of the soil, in particular in the vicinity of the roots of the useful plants, which, as a rule, has a highly disadvantageous effect on plant growth. In general, salinization of the soil is increased by the trickle irrigation method.

It is an object of the present invention to develop a method or a product which promotes plant growth and the utilization of nutrients, in particular on alkaline or volcanic agricultural soil, while avoiding salinization of the soil.

We have found that this object is achieved by a method for improving plant growth by application of a mixture M comprising a component a) of a1) 20 to 96% by weight of sulfur, a2) 4 to 80% by weight of a complexing agent and, if appropriate, one or more crop protection agents b) and/or further components c); by the use of a polymeric cation complexing agent a2) for the preparation of a mixture comprising elemental sulfur, which mixture is used as means for improving plant growth and by the use of a mixture M as means for improving plant growth; by an irrigation system encompassing A) a storage container filled with a mixture M, B) if appropriate a pump, C) a pipeline system which is connected to the storage container at the inlet position and which supplies one or more D) trickle systems and/or sprinklers at the outlet position(s), and by plantations encompassing useful plants and/or ornamentals, the soil and/or the substrate and the irrigation system as claimed as essential components.

The nature of the sulfur present in the mixture according to the invention is not critical. Any elemental sulfur which has been known for a long time, described in detail and commercially available may be used. The sulfur which can be obtained from natural-gas refineries is an example of a suitable material.

The amount of the sulfur a1) in component a) according to the invention is in the range of from 20 to 96% by weight, preferably 70 to 95% by weight and in particular 75 to 85% by weight, in each case based on the total weight of component a).

Suitable as complexing agents a2) are nonpolymeric complex-forming compounds, but preferably polymeric complex-forming compounds. The complexing agent a2) can comprise the pure complex-forming compounds, but also any mixtures of the pure complex-forming compounds, the mixing ratio not being critical.

Suitable nonpolymeric complex-forming compounds are EDTA (ethylenediaminetetraacetic acid), NTA (nitrilotriacetic acid), EDDHA (ethylenediamined(ortho-hydroxyphenyl)acetic acid), DTPA (diethylenetriaminepentaacetic acid), HEDTA (hydroxyethylenediaminetriacetic acid), preferably ethylenediaminetetraacetic acid and/or diethylenetriaminepentaacetic acid.

Suitable polymeric complex-forming compounds are polyacrylic acid and its salts, in particular the sodium salts, polymethacrylic acid and its salts, in particular the sodium salts, polymaleic acid, prepared for example by hydrolyzing polymaleic anhydride, in particular the sodium salts, polyvinylpyrrolidone, acrylic acid/maleic acid copolymers, in particular the sodium salts, vinylpyrrolidone/vinyl acetate copolymers; graft copolymers of vinylpyrrolidone and $C_{20}$-α-olefin; vinylpyrrolidone/acrylic acid copolymers; vinylpyrrolidone/dimethylaminoethyl acrylate copolymers; methyl vinyl ether/maleic anhydride (derivative) copolymers; styrene/maleic anhydride copolymers; polyaspartic acid and its salts; poly-p-vinylbenzenesulfonic acid and its salts; copolymers of ethylene and/or propylene and/or isobutene and (meth)acrylic acid; modified starches, modified celluloses, for example carboxymethylcellulose; alginates; lignin derivatives such as lignosulfonates; chitosans; modified polysaccharides; phenolsulfonic acid/formaldehyde condensates; naphthalenesulfonic acid/formaldehyde condensates.

Polymeric complex-forming compounds a2) which are preferably employed are lignosulfonates; naphthalenesulfonic acid/formaldehyde condensates, polyacrylic acid and its salts, in particular the sodium salts; polymethacrylic acid and its salts, in particular the sodium salts; polymaleic acid or its salts, prepared for example by hydrolyzing polymaleic anhydride, in particular the sodium salts; acrylic acid/maleic acid copolymers, in particular the sodium salts; polyacrylates; polyaspartates and other polyamino acids. Polymeric complex-forming compounds which are used in particular are lignosulfonates and/or naphthalenesulfonic acid/formaldehyde condensates.

Lignosulfonates are known and are defined, for example, in Römpp Chemielexikon [Dictionary of Chemistry], 9th Edition, Volume 3, Georg-Thieme Verlag, Stuttgart, N.Y. 1990, page 2511. Lignosulfonates which are well suited are the alkali metal salts and/or alkaline earth metal salts and/or ammonium salts, for example the ammonium, sodium, potassium, calcium or magnesium salts of lignosulfonic acid. The sodium, potassium or calcium salts are preferably used, and the sodium and/or calcium salts are very particularly preferably used.

Naturally, the term lignosulfonates also encompasses mixed salts of different ions such as potassium/sodium lignosulfonate, potassium/calcium lignosulfonate or the like, in particular sodium/calcium lignosulfonate.

Naphthalenesulfonic acid/formaldehyde condensates are likewise known and commercially available for example as Tamol® products from BASF Aktiengesellschaft.

The amount of the cation complexing agent a2) in component a) according to the invention is in the range of from 4 to 80% by weight, preferably 5 to 30% by weight, in particular 15 to 25% by weight, in each case based on the total weight of component a).

If a mixture of lignosulfonate and naphthalenesulfonic acid/formaldehyde condensate is used as component a2), the lignosulfonate in this mixture generally amounts to in the rage from 10 to 90% by weight and the naphthalenesulfonic acid/formaldehyde condensate in this mixture amounts to the complement in the range of from 90 to 10% by weight.

Components a) which are particularly well suited in accordance with the invention are those of 75 to 85% by weight of sulfur and 15 to 25% by weight of lignosulfonate.

Examples of components a) according to the invention are: 95% by weight sulfur+5% by weight sodium lignosulfonate; 90% by weight sulfur+10% by weight sodium lignosulfonate; 80% by weight sulfur+20% by weight sodium lignosulfonate; 75% by weight sulfur+25% by weight sodium lignosulfonate; 95% by weight sulfur+5% by weight potassium lignosulfonate; 90% by weight sulfur+10% by weight potassium lignosulfonate; 80% by weight sulfur+20% by weight potassium lignosulfonate; : 95% by weight sulfur+5% by weight calcium lignosulfonate; 90% by weight sulfur+10% by weight calcium lignosulfonate; 80% by weight sulfur+20% by weight calcium lignosulfonate.

The mixture M according to the invention, or component a), can be prepared by mixing, comminuting, drying, for example spray drying.

As a rule, the mixture M according to the invention, or component a), exists in flowable form as granular particles with a mean particle size—determined using the sieve analysis method as specified by CIPAC MT 170 (CIPAC Handbook F—Page 420—Dry Sieve Analysis of Waterdispersible Granules) in the range of from 50 µm to 4 mm, preferably in the range of from 100 µm to 2 mm, whose primary particles are, as a rule, 0.05 to 8 µm in size (determined using ISO Method 13320-1: 1999 (Particle Size Analysis—Laser Diffraction Methods).

In addition to component a), the mixture M according to the invention can additionally comprise one or more crop protectants b) and/or further constituents c).

Crop protectants b) which are suitable are herbicides, pesticides and fungicides. Pesticides are understood as meaning, inter alia, acaricides, insecticides and nematicides.

Preferred herbicides, fungicides, acaricides, insecticides and nematicides can be seen from http://www.hclrss.demon.co.uk/index_cn_frame.html (Index of common names). A list of preferred herbicides, fungicides, acaricides, insecticides and nematicides is given hereinbelow, some of the active ingredients being mentioned several times with different "common names":

abamectin; acephate; acequinocyl; acetamiprid; acethion; acetochlor; acetoprole; acifluorfen; aclonifen; ACN; acrinathrin; acrolein; acrylonitrile; acypetacs; alachlor; alanap; alanycarb; aldicarb; aldimorph; aldoxycarb; aldrin; allethrin; d-trans-allethrin; allidochlor; allosamidin; alloxydim; allyl alcohol; allyxycarb; alorac; alpha-cypermethrin; ametridione; ametryn; ametryne; amibuzin; amicarbazone; amidithion; amidoflumet; amidosulfuron; aminocarb; aminotriazole; amiprofos-methyl; amiton; amitraz; amitrole; ammonium sulfamate; ampropylfos; AMS; anabasine; anilazine; anilofos; anisuron; arprocarb; arsenous oxide; asulam; athidathion; atraton; atrazine; aureofungin; avermectin B1; azaconazole; azadirachtin; azafenidin; azamethiphos; azidithion; azimsulfuron; azinphos-ethyl (=azinphosethyl); azinphos-methyl (=azinphosmethyl); aziprotryn (=aziprotryne); azithiram; azobenzene; azocyclotin; azothoate; azoxystrobin; barban (=barbanate); barium hexafluorosilicate; barium polysulfide; barium silicofluoride; barthrin; BCPC; beflubutamid; benalaxyl; benazolin; bendiocarb; bendioxide; benefin (=benfluralin); benfuracarb; benfuresate; benodanil; benomyl; benoxafos; benquinox; bensulfuron; bensulide; bensultap; bentaluron; bentazon (=bentazone); benthiocarb; benzadox; benzalkonium chloride; benzamacril; benzamizole; benzamorf; benzene hexachloride; benzfendizone; benzipram; benzobicyclon; benzoepin; benzofenap; benzofluor; benzohydroxamic acid; benzomate benzoximate (=benzoylprop); benzthiazuron; benzyl benzoate; beta-cyfluthrin; beta-cypermethrin; bethoxazin; BBC; gamma-BHC; bialaphos; bifenazate; bifenox; bifenthrin; bilanafos; binapacryl; bioallethrin; bioethanomethrin; biopermethrin; bioresmethrin; biphenyl; bispyribac; bistrifluron; bitertanol; bithionol; blasticidin-S; borax; Bordeaux mixture; BPPS; bromacil; bromchlophos; bromfenvinfos; bromobonil; bromobutide; bromocyclen; bromo-DDT; bromofenoxim; bromomethane; bromophos; bromophos-ethyl; bromopropylate; bromoxynil; brompyrazon; bromuconazole; BRP; bufencarb; bupirimate; buprofezin; Burgundy mixture; butacarb; butachlor; butafenacil; butam; butamifos; butathiofos; butenachlor; buthidazole; buthiobate; buthiuron; butocarboxim; butonate; butoxycarboxim; butralin; butroxydim; buturon; butylamine; butylate; butylchlorophos; cacodylic acid; cadusafos; cafenstrole; calcium arsenate; calcium chlorate; calcium cyanamide; calcium polysulfide; cambendichlor; camphechlor; captafol; captan; carbam; carbamorph; carbanolate; carbaryl; carbasulam; carbathion; carbendazim; carbetamide; carbofuran; carbon disulfide; carbon tetrachloride; carbophenothion; carbophos; carbosulfan; carboxazole; carboxin; carfentrazone; carpropamid; cartap; carvone; CDAA; CDEA; CDEC; CEPC; cerenox; cevadilla; Cheshunt mixture; chinalphos; chinalphos-methyl; chinomethionat; chlobenthiazone; chlomethoxyfen; chlor-IPC; chloramben; chloraniformethan; chloranil; chloranocryl; chlorazifop; chlorazine; chlorbenside; chlorbicyclen; chlorbromuron; chlorbufam; chlordane; chlordecone; chlordimeform; chlorethoxyfos; chloreturon; chlorfenac; chlorfenapyr; chlorfenazole; chlorfenethol; chlorfenidim; chlorfnizon; chlorfenprop; chlorfenson; chlorfensulphide; chlorfenvinphos; chlorfenvinphos-methyl; chlorfluazuron; chlorflurazole; chlorflurecol; chlorflurenol; chloridazon; chlorimuron; chlorinate; chlormephos; chlormethoxynil; chlornitrofen; chloroacetic acid; chlorobenzilate; chloroform; chloromebuform; chloromethiuron; chloroneb; chlorophos; chloropicrin; chloropon; chloropropylate; chlorothalonil; chlorotoluron; chloroxifenidim (=chloroxuron); chloroxynil; chlorphoxim; chlorprazophos; chlorprocarb; chlorpropham; chlorpyrifos; chlorpyrifos-methyl; chlorquinox; chlorsulfuron; chlorthal; chlorthiamid; chlorthiophos; chlortoluron; chlozolinate; chromafenozide; cinerin I; cinerin II; cinidon-ethyl, cinmethylin; cinosulfuron; cisanilide; cismethrin; clethodim; climbazole; cliodinate; clodinafop; cloethocarb; clofentezine; clofop; clomazone; clomeprop; cloprop; cloproxydim; clopyralid; cloransulam; closantel; clothianidin; clotrimazole; CMA; CMMP; CMP; CMU; copper acetate; copper acetoarsenite; copper arsenate; copper carbonate, basic; copper hydroxide; copper naphthenate; copper oleate; copper oxychloride; copper 8-quinolinolate; copper silicate; copper sulfate; copper sulfate, basic; copper zinc chromate; coumaphos; coumithoate; 4-CPA; 4-CPB; CPMF; 4-CPP; CPPC; cresol (=cresylic acid); crotamiton; crotoxyfos (=crotoxyphos); crufomate; cryolite; cufraneb; cumyluron; cuprobam; cuprous oxide; CVMP; cyanatryn; cyanazine; cyanofenphos; cyanophos; cyanthoate; cyazofamid; cyclafuramid; cyclethrin; cycloate; cycloheximide; cycloprothrin; cyclosulfamuron; cycloxydim; cyflufenamid; cycluron; cyfluthrin; beta-cyfluthrin; cyhalofop; cyhalothrin; gamma-cyhalothrin; lambda-cyhalothrin; cyhexatin; cymoxanil; cypendazole; cypermethrin; alphacypermethrin; beta-cypermethrin; theta-cypermethrin; zeta-cypermethrin; cyperquat; cyphenothrin; cyprazine; cyprazole; cyprex; cyproconazole; cyprodinil; cyprofuram; cypromid; cyromazine; cythioate; 2,4-D; 3,4-DA; daimuron; dalapon; dazomet; 2,4-DB; 3,4-DB; DBCP; DCB; DCIP; DCPA (USA); DCPA (Japan); DCU; DDD; DDPP; DDT; pp (pure)-DDT; DDVP; 2,4-DEB; debacarb; decafentin; decarbofuran; dehydroacetic acid; deiquat; delachlor; delnav; deltamethrin; demephion; demephion-O; demephion-S; demeton; demeton-methyl; demeton-O; demeton-O-methyl; demeton-S; demeton-S-methyl; demeton-S-methylsulphon; (=demeton-S-methyl sulphone); DEP; 2,4-DEP; depalléthrine; derris; 2,4-=DES; desmedipham; desmetryn (=desmetryne); diafenthiuron; dialifor (=dialifos); di-al-late (=diallate); diamidafos; dianat; diazinon; dibrom; 1,2-dibromoethane; dicamba; dicapthon; dichlobenil; dichlofenthion; dichlofluanid; dichlone; dichloralurea; dichlorfenidim; dichlormate; o-dichlorobenzene (=ortho-dichlorobenzene); p-dichlorobenzene (=para-dichlorobenzene); 1,2-dichloroethane; dichloromethane; dichlorophen; 1,2-dichloropropane; 1,3-dichloropropene; dichlorprop; dichlorprop-P; dichlorvos; dichlozoline; diclobutrazol; diclocymet; diclofop; diclomezine; dicloran; diclosulam; dicofol; dicresyl; dicrotophos; dicryl; dicyclanil; dieldrin; dienochlor; diethamquat; diethatyl; diethion (=diéthion); diethofencarb; diethyl pyrocarbonate; difenoconazole; difenopenten; difenoxuron; difenzoquat; diflubenzuron; diflufenican (=diflufenicanil); diflufenzopyr; diflumetorim; dilor; dimefox; dimefuron; dimehypo; dimepiperate; dimetan; dimethachlor; dimethametryn; dimethenamid; dimethenamid-P; dimethirimol; dimethoate; dimethomorph; dimethrin; dimethylvinphos; dimetilan; dimexano; dimidazon; dimoxystrobin; dimpylate; dinex; diniconazole; diniconazole-M; dinitramine; dinobuton; dinocap; dinocap-4; dinocap-6; dinocton; dinofenate; dinopenten; dinoprop; dinosam; dinoseb; dinosulfon; dinotefuran; dinoterb; dinoterbon; diofenolan; dioxabenzofos; dioxacarb; dioxathion; diphenamid; diphenyl sulfone; diphenylamine; diphenylsulphide; dipropetryn; dipterex; dipyrithione; diquat; disugran; disul; disulfiram; disulfoton; ditalimfos; dithianon; dithicrofos; dithiométon; dithiopyr; diuron; dixanthogen; DMPA; DNOC; dodemorph; dodicin; dodine; dofenapyn; doguadine; doramectin (=2,4-DP); 3,4-DP; DPC; drazoxolon; DSMA; d-trans-allethrin; dymron; EBEP; ecdysone; ecdysterone; echlomezol; EDB; EDC; EDDP (=edifenphos); eglinazine; emamectin; EMPC; empenthrin; endosulfan; endothal (=endothall); endothion; endrin; ephirsulfonate; EPN; epofenonane; epoxiconazole; eprinomectin; epronaz; EPTC; erbon; esfenvalerate; ESP; esprocarb; etaconazole; etaphos; etem; ethaboxam; ethalfluralin; ethametsulfuron; ethidimuron; ethiofencarb; ethiolate; ethion; ethiprole; ethirimol; ethoate-methyl; ethofumesate; ethoprop (=ethoprophos); ethoxyfen; ethoxyguin; ethoxysulfuron; ethyl pyrophosphate; ethylan (=ethyl-DDD); ethylene dibromide; ethylene dichloride; ethylene oxide; ethyl formate; ethylmercury acetate; ethylmercury bromide; ethylmercury chloride; ethylmercury phosphate; etinofen; ETM; etnipromid; etobenzanid; etofenprox; etoxazole; etridiazole; etrimfos; EXD; famoxadone; famphur; fenac; fenamidone; fenaminosulf; fenamiphos; fenapanil; fenarimol; fenasulam; fenazaflor; fenazaquin; fenbuconazole; fenbutatin oxide; fenchlorphos; fenethacarb; fenfluthrin; fenfuram; fenhexamid; fenidin; fenitropan; fenitrothion; fénizon; fenobucarb; fenolovo; fenoprop; fenothiocarb; fenoxacrim; fenoxanil; fenoxaprop; fenoxaprop-P; fenoxycarb; fenpiclonil; fenpirithrin; fenpropathrin; fempropidint. fenpropimorph; fenpyroximate; fenridazon; fenson; fensulfothion; fenteracol; fenthiaprop; fenthion; fenthion-ethyl; fentiaprop; fentin; fentrazamide; fentrifanil; fenuron; fenvalerate; ferbam; ferimzone; ferrous sulfate; fipronil; flamprop; flamprop-M; flazasulfuron; flonicamid; florasulam; fluacrypyrim; fluazifop; fluazifop-P; fluazinam; fluazolate; fluazuron; flubenzimine; flucarbazone; fluchloralin; flucofuron; flucycloxuron; flucythrinate; fludioxonil; fluenetil; flufenacet; flufenerim; flufenican; flufenoxuron; flufenprox; flufenpyr; flumethrin; flumetover; flumetsulam; flumezin; flumiclorac; flumioxazin; flumipropyn; fluometuron; fluorbenside; fluoridamid; fluorochloridone; fluorodifen; fluoroglycofen; fluoroimide; fluoromidine; fluoronitrofen; fluothiuron; fluotrimazole; flupoxam; flupropacil; flupropanate; flupyrsulfuron; fluquinconazole; fluridone; flurochloridone; fluromidine; fluroxypyr; flurtamone; flusilazole; flusulfamide; fluthiacet; flutolanil; flutriafol; fluvalinate; tau-fluvalinate; folpel (=folpet); fomesafen; fonofos; foramsulfuron; formaldehyde; formetanate; formothion; formparanate; fosamine; fosetyl; fosmethilan; fospirate; fosthiazate; fosthietan; fthalide; fuberidazole; furalaxyl; furametpyr; furathiocarb; furcarbanil; furconazole; furconazole-cis; furethrin; furmecyclox; furophanate; furyloxyfen; gamma-BHC; gamma-cyhalothrin; gamma-HCH; glufosinate; glyodin; glyphosate; griseofulvin; guanoctine (=guazatine); halacrinate; halfenprox; halofenozide; halosafen; halosulfuron; haloxydine; haloxyfop; HCA; HCH; gamma-HCH; HEOD; heptachlor; heptenophos; heterophos; hexachlor (=hexachloran); hexachloroacetone; hexachlorobenzene; hexachlorobutadiene; hexaqonazole; hexaflumuron; hexafluoramin; hexaflurate; hexazinone; hexylthiofos; hexythiazox; HHDN; hydramethylnon; hydrogen; cyanide; hydroprene; hydroxyisoxazole; 8-hydroxyquinoline; sulfate; hymexazol; hyquincarb; IBP; imazalil; imazamethabenz; imazamox; imazapic; imazapyr; imazaquin; imazethapyr; imazosulfuron; imibenconazole; imidacloprid; iminoctadine; imiprothrin; indanofan; indoxacarb; iodobonil; iodofenphos; iodosulfuron; ioxynil; ipazine; IPC; ipconazole; iprobenfos; iprodione; iprovalicarb; iprymidam; IPSP; IPX; isamidofos; isazofos; isobenzan; isocarbamid; isocil; isodrin; isofenphos; isomethiozin; isonoruron; isopolinate; isoprocarb; isoprocil; isopropalin; isoprothiolane; isoproturon; isothioate; isouron; isovaledione; isoxaben; isoxachlortole; isoxaflutole; isoxapyrifop; isoxathion; isuron; ivermectin; jasmolin I; jasmolin II; jodfenphos; juvenile hormone I; juvenile hormone. II; juvenile hormone III; karbutilate; kasugamycin; kelevan;

kinoprene; kresoxim-methyl; lactofen; lambda-cyhalothrin; lead arsenate; lenacil; leptophos; lime sulfur; d-limonene; lindane; linuron; lirimfos; lufenuron; lythidathion; M-74; M-81; MAA; malathion; maldison; malonoben; MAMA; mancopper; mancozeb; maneb; mazidox; MCC; MCPA; MCPA-thioethyl; MCPB; 2,4-MCPB; mebenil; mecarbam; mecarbinzid; mecarphon; mecoprop; mecoprop-P; medinoterb; mefenacet; mefluidide; menazon; MEP; mepanipyrim; mephosfolan; mepronil; mercaptodimethur; mercaptophos; mercaptophos-teolevy; mercaptothion; mercuric chloride; mercuric oxide; mercurous chloride; mesoprazine; mesosulfuron; mesotrione; mesulfen; mesulfenfos; mesulphen; metalaxyl; metalaxyl-M; metam; metamitron; metaphos; metaxon; metazachlor; metazoxolon; metconazole; metflurazon; methabenzthiazuron; methacrifos; methalpropalin; metham; methamidophos; methasulfocarb; methazole; methfuroxam; methibenzuron; methidathion; methiobencarb; methiocarb; methiuron; methocrotophos; métholcarb; methometon; methomyl; methoprene; methoprotryn; methoprotryne; methoxychlor; 2-methoxyethylmercury chloride; methoxyfenozide; methyl bromide; methylchloroform; methyldithiocarbamic acid; methyldymron; methylene chloride; methyl isothiocyanate; methyl-mercaptophos; methylmercaptophos oxide; methyl-mercaptophos-teolevy; methylmercury benzoate; methylmercury dicyandiamide; methyl parathion; methyltriazothion; metiram; metobenzuron; metobromuron; metolachlor; S-metolachlor; metolcarb; metominostrobin; metosulam; metoxadiazone; metoxuron; metrafenone; metribuzin; metriphonate; metsulfovax; metsulfuron; mevinphos; mexacarbate; milbemectin; milneb; mipafox; MIPC; mirex; MNAF; molinate; monalide; monisouron; monochloroacetic acid; monocrotophos; monolinuron; monosulfiram; monuron; morfamquat; morphothion; MPMC; MSMA; MTMC; myclobutanil; myclozolin; nabam; naftalofos; naled; naphthalene; naphthalic anhydride; naphthalophos; naproanilide; napropamide; naptalam; natamycin; neburea; neburon; nendrin; nichlorfos; niclofen; niclosamide; nicobifen; nicosulfuron; nicotine; nifluridide; nikkomycins; NIP; nipyraclofen; nitenpyram; nithiazine; nitralin; nitrapyrin; nitrilacarb; nitrofen; nitrofluorfen; nitrostyrene; nitrothal-isopropyl; nobormide; norbormide; norea;,norflurazon; noruron; novaluron; noviflumuron; NPA; nuarimol; OCH; octhilinone; o-dichlorobenzene; ofurace; omethoate; orbencarb; orthobencarb; ortho-dichlorobenzene; oryzalin; ovatron; ovex; oxadiargyl; oxadiazon; oxadixyl; oxamyl; oxapyrazon; oxasulfuron; oxaziclomefone; oxine-copper;. oxine-Cu; oxpoconazole; oxycarboxin; oxydemeton-methyl; oxydeprofos; oxydisulfoton; oxyfluorfen; oxythioquinox; PAC; palléthrine; PAP; para-dichlorobenzene; parafluron; paraquat; parathion; parathion-methyl; Paris green; PCNB; PCP; p-dichlorobenzene; pebulatet pédinex; pefurazoate; penconazole; pencycuron; pendimethalin; penfluron; penoxsulam; pentachlorophenol; pentanochlor; pentoxazone; perfluidone; permethrin; pethoxamid; PHC; phénétacarbe; phenisopham; phenkapton; phenmedipham; phenmediphamethyl; phenobenzuron; phenothiol; phenothrin; phenthoate; phenylmercuriurea; phenylmercury acetate; phenylmercury chloride; phenylmercury nitrate; phenylmercury salicylate; 2-phenylphenol; phorate; phosalone; phosdiphen; phosfan; phosmet; phosnichlor; phosphamide; phosphamidon; phosphine; phosphocarb; phoxim; phoxim-methyl; phthalide; phthalophos; phthalthrin; picloram; picolinafen; picoxystrobin; piperophos; pirimetaphos; pirimicarb; pirimiphosethyl; pirimiphos-methyl; PMA; PMP; polycarbamate; polychlorcamphene; polyethoxyquinoline; polyoxins; polyoxorim; potassium arsenite; potassium cyanate; potassium polysulfide; potassium thiocyanate; pp-DDT (pure); prallethrin; precocene I; precocene II; precocene III; pretilachlor; primidophos; primisulfuron; probenazole; prochloraz; proclonol; procyazine; procymidone; prodiamine; profenofos; profluazol; profluralin; profoxydim; proglinazine; promacyl; promecarb; prometon; prometryn; prometryne; pronamide; propachlor; propafos; propamocarb; propanil; propaphos; propaquizafop; propargite; propazine; propetamphos; propham; propiconazole; propineb; propisochlor; propoxur; propoxycarbazone; propyzamide; prosulfalin; prosulfocarb; prosulfuron; prothidathion; prothiocarb; prothiofos; prothoate; protrifenbute; proxan; prymidophos; prynachlor; pydanon; pyracarbolid; pyraclofos; pyraclonil; pyraclostrobin; pyraflufen; pyrazolate; pyrazolynate; pyrazon; pyrazophos; pyrazosulfuron; pyrazoxyfen; pyresmethrin; pyrethrin I; pyrethrin II; pyrethrins; pyribenzoxim; pyributicarb; pyriclor; pyridaben; pyridafol; pyridaphenthion; pyridate; pyridinitril; pyrifenox; pyriftalid; pyriméthaphos; pyrimethanil; pyrimicarbe; pyrimidifen; pyrimitate; pyriminobac; pyrimiphoséthyl; pyrimiphos-méthyl; pyriproxyfen; pyrithiobac; pyroquilon; pyroxychlor; pyroxyfur; quassia; quinacetol; quinalphos; quinalphos-methyl; quinazamid; quinclorac; quinconazole; quinmerac; quinoclamine; quinomethionate; quinonamid; quinothion; quinoxyfen; quintiofos; quintozene; quizalofop; quizalofop-P; rabenzazole; rafoxanide; reglone; resmethrin; rhodethanil; rimsulfuron; rodéthanil; ronnel; rotenone; ryania; sabadilla; salicylanilide; schradan; sebuthylazine; secbumeton; selamectin; sesone; sethoxydim; sevin; siduron; silafluofen; silthiofam; silvex; simazine; simeconazole; simeton; simetryn; simetryne; SMA; sodium arsenite; sodium chlorate; sodium fluoride; sodium hexafluorosilicate; sodium orthophenylphenoxide; sodium pentachlorophenate; sodium pentachlorophenoxide; sodium o-phenylphenoxide; sodium polysulfide; sodium silicofluoride; disodium tetraborate; sodium thiocyanate; solan; sophamide; spinosad; spirodiclofen; spiroxamine; stirofos; streptomycin; sulcofuron; sulcotrione; sulfallate; sulfentrazone; sulfiram;.sulfluramid; sulfometuron; sulfosulfuron; sulfotep; sulfotepp; sulfur; sulfuric acid; sulfuryl fluoride; sulglycapin; sulprofos; sultropen; swep; 2,4,5-T; tau-fluvalinate; tazimcarb; 2,4,5-TB; 2,3,6-TBA; TBTO; TBZ; TCA; TCBA; TCMTB; TCNB; TDE; tebuconazole; tebufenozide; tebufenpyrad; tebupirimfos; tebutam; tebuthiuron; tecloftalam; tecnazene; tecoram; tedion; teflubenzuron; tefluthrin; temephos; TEPP; tepraloxydim; terallethrin; terbacil; terbucarb; terbuchlor, terbufos; terbumeton, terbuthylazine; terbutol; terbutryn; terbutryne; terraclor; tetrachloroethane; tetrachlorvinphos; tetraconazole; tetradifon; tetradisul; tetrafluron; tetramethrin; tetranactin; tetrasul; thenylchlor; theta-cypermethrin;. thiabendazole; thiacloprid; thiadiazine; thiadifluor; thiamethoxam; thiameturon; thiazafluron; thiazone; thiazopyr; thicrofos; thicyofen; thidiazimin; thidiazuron; thifensulfuron; thifluzamide; thiobencarb; thiocarboxime; thiochlorfenphim; thiochlorphenphime; thiocyclam; thiodan; thiodicarb; thiofanocarb; thiofanox; thiomersal; thiometon; thionazin; thiophanate; thiophanate-ethyl; thiophanate-methyl; thiophos; thioquinox; thiosultap; thiram; thiuram; thuringiensin; tiabendazole; tiocarbazil; tioclorim; tioxymid; TMTD; tolclofos-methyl; tolylfluanid; tolfenpyrad; tolylmercury acetate; toxaphene; 2,4,5-TP; 2,3,3-TPA; TPN; tralkoxydim; tralomethrin; d-trans-allethrin; transfluthrin; transpermethrin; tri-allate; triadimefon; triadimenol; triallate; triamiphos; triarathene; triarimol; triasulfuron; triazamate; triazbutil; triaziflam; triazophos; triazothion; triazoxide; tribenuron; tributyltin oxide; tricamba; trichlamide; trichlorfon; trichlormetaphos-3; trichloronat; trichloronate; trichlorphon; triclopyr; tricyclazole; tricyclohexyltin hydroxide; tridemorph; tridiphane; trietazine;

trifenofos; trifloxystrobin; trifloxysulfuron; triflumizole; triflumuron; trifluralin; triflusulfuron; trifop; trifopsime; triforine; trimeturon; triphenyltin; triprene; tripropindan; tritac; triticonazole; tritosulfuron; uniconazole; uniconazole-P; validamycin; vamidothion; vaniliprole; vernolate; vinclozolin; XMC; xylachlor; xylenols; xylylcarb; zarilamid; zeta-cypermethrin; zinc naphthenate; zineb; zolaprofos; zoxamide trichlorophenate; 1,2-dichloropropane; 1,3-dichloropropene; 2-methoxyethylmercury chloride; 2-phenylphenol; 2,3,3-TPA; 2,3,6-TBA; 2,4-D; 2,4-DB; 2,4-DEB; 2,4-DEP; 2,4-DP; 2,4-MCPB; 2,4,5-T; 2,4,5-TB; 2,4,5-TP; 3,4-DA; 3,4-DB; 3,4-DP; 4-CPA; 4-CPB; 4-CPP; 8-hydroxyquinoline sulfate.

Naturally, the crop protectants b) may also be present as a mixture in the usual mixing ratios. The amount of crop protectant b), based on the amount of component a), is usually 1 to 25% by weight, preferably 3 to 15% by weight.

The crop protectant b) need not be present readily mixed with the components a) and, if appropriate, c), but may also be admixed before the components a) and, if appropriate, c) are applied, for example as what is known as tank mix.

Preferred crop protectants b) are soil-acting agents such as acetochlor, alachlor, aldicarb, asulam, atrazine, benalaxyl, bendiocarb, benfuracarb, benomyl, benthiocarb, borax, bromacil, butachbor, butam, cadusafos, calcium cyanamide, captafol, captan, carbaryl, carbendazim, carbofuran, carbon disulfide, carbon tetrachloride, carbosulfan, carboxin, CDAA, CDEA, CDEC, CEPC, chlor-IPC, chloramben, chlorbromuron, chlordane, chlorfluazuron, chloridazon, chloropicrin, chlorothalonil, chlorotoluron, chloroxifenidim (=chloroxuron), chlorpropham, copper acetate, copper acetoarsenite, copper arsenate, copper carbonate, basic, copper hydroxide, copper naphthenate, copper oleate, copper oxychloride, copper 8-quinolinolate, copper silicate, copper sulfate, basic copper zinc chromate, cyanazine, dalapon, dazomet, decarbofuran, di-allate (=diallate), diazinon, dibrom, 1,2-dibromoethane, dichlobenil, 1,2-dichloroethane, dichloromethane, 1,2-dichloropropane, 1,3-dichloropropene, diel.drin, diphenamid, dipterex, diuron, endosulfan, endrin, epoxiconazole, EPTC, ethalfluralin, ethylan (=ethyl-DDD), ethylene dibromide, ethylene dichloride, ethylene oxide, ethylmercury bromide, ethylmercury chloride, ethylmercury phosphate, fenuron, ferbam, ferrous sulfate, fluchloralin, folpel (=folpet), formaldehyde, fosthiazate, furmecyclox, gamma-BHC, gamma-cyhalothrin, gamma-HCH, guanoctine (=guazatine), HCH, gamma-HCH, heptachlor, hexachlor, hydrogencyanide, imazalil, imazamox, imazapic, imazapyr, imazaquin, imazethapyr, imazosulfuron, imidacloprid, IPC, iprodione, isonoruron, isoprocarb, isoproturon, isouron, lactofen, lenacil, lime sulfur, lindane, linuron, mancopper, mancozeb, maneb, mercuric chloride, mercuric oxide, mercurous chloride, metalaxyl, metalaxyl-M, metam, metazachlor, methabenzthiazuron, metham, methyl bromide, methylchloroform, isothiocyanate, methyl-mercaptophos, methylmercaptophos, methylmercury benzoate, methylmercury, metiram, metobenzuron, metobromuron, metolachlor, S-metolachlor, metosulam, metoxuron, metribuzin, mirex, molinate, monalide, monolinuron, monuron, MSMA, nabam, naled, naphthalic anhydride, napropamide, naptalam, neburea, neburon, nitralin, norflurazon, noruron, novaluron, ofurace, oryzalin, oxadixyl, oxine-copper, oxine-Cu, oxycarboxin, PCNB, PCP, pebulate, pendimethalin, phenylmercuriurea, phenylmercury acetate, phenylmercury chloride, phenylmercury nitrate, phenylmercury salicylate, phorate, phosphocarb, phthalide, phthalophos, phthalthrin, picloram, pirimicarb, potassium arsenite, potassium cyanate, potassium polysulfide, potassium thiocyanate, prochloraz, procymidone, profluralin, propham, propiconazole, propineb, prosulfalin, pyrazon, quinclorac, sevin, siduron, simazine, sulfur, sulfuric acid, tebuconazole, terbacil, terraclor, thiabendazole, thiacloprid, thiameturon, thiobencarb, thiocarboxime, thiodan, thiodicarb, thiofanocarb, thiophanate, thiophanate-ethyl, thiophanate-methyl, thiram, thiuram, tiabendazole, TMTD, toxaphene, tri-allate, triadimefon, triadimenol, triallate, tribenuron, hydroxide, triflumuron, trifluralin, vernolate, vinclozolin, zineb, 1,2-dichloropropane, 1,3-dichloropropene.

Further suitable components c) in the mixture M are: water in minor amounts, for example 1 to 6% by weight based on component a), fillers, water softeners and the additives conventionally used in the agricultural sector in usual amounts, for example plant nutrients in the various forms, and furthermore fillers such as kaolin clay, bentonite, talc, calcium carbonate; anticaking agents such as finely divided silicas; soluble salts such as sodium chloride, sodium sulfate, ammonium sulfate; surfactants such as alkyl sulfates, alkylsulfonates, alkyl polyglycosides, alkyl ether sulfates, alkylbenzenesulfonates, alkylsuccinic ester sulfonates, alkyl esters of mono/diphosphoric acid, sarcosinates, taurates, alkoxylated animal/vegetable fats and oils, glycerol esters, alkoxylated fatty alcohols and oxo alcohols, alkoxylated fatty acids, alkylphenol ethoxylates, fatty amine alkoxylates, fatty acid amide alkoxylates, sugar surfactants such as sorbitan fatty acid esters and their ethoxylates, ethylene oxide/propylene oxide block polymers; antifoams, such as silicone surfactants.

The mixture M according to the invention can be used or applied in practice in dry form, for example in pure form, or as formulation, or else in a liquid medium.

Suitable liquid media are: aqueous salt solutions, aqueous nutrient solutions (for example made of nutrient salts and/or ureas), in particular water.

As a rule, the mixture M according to the invention is employed in an aqueous medium, in particular water, in a concentration range of from 0.0001 to 6% by weight, preferably 0.001 to 0.01% by weight, in particular 0.0015 to 0.005% by weight, based on the total weight of mixture M according to the invention and medium.

The mixtures M according to the invention can be sold commercially in different types of formulation. Suitable types of formulation are liquid suspension concentrates, solid water-dispersible powders, water-dispersible granules and granules for broadcasting. Water-dispersible granules are preferred.

The total application rate of the mixtures M according to the invention differs markedly from the total application rate of a comparable (for example commercial) mixture for pure crop protection purposes, for example in the application of fungicides, in comparable crops. When used purely for crop protection purposes, the total application rate, for example when using the product Kumulus DF from BASF Aktiengesellschaft, is usually in the range of from 5 to 50 kg/(ha, crop, season). When used according to the invention as soil conditioner, a total application rate of more than 50 and up to 5000 kg/(ha, crop, season) of the mixture M is usually used, preferably a total application rate of more than 50 and up to 500 kg/(ha, crop, season) of the mixture M.

The method according to the invention can be applied to all soils and/or substrates (growth media, for example rockwool) on which useful plants and/or ornamentals are usually produced; neutral to alkaline Boils and/or substrates, including volcanic soils, are preferred. Neutral to alkaline soils and/or substrates are to be understood as meaning, for the present purpose, those whose pH is in the range of from 6.2 to 9.0, preferably 7.0 to 8.2.

The method according to the invention can be carried out with all customary irrigation systems or irrigation methods which are described, for example, in Antonio L. Alarcon, "tecnologia para cultivos de alto rendimiento" [Technology for high-yielding cultivars], Ed.: NOVEDADES AGRICOLAS S. A. Torre Pacheco (Murcia), 2000 (ISBN: 84-607-1212-5) or in Yaron, B; Danfors, E and Vaadia, Y.: Arid zone irrigation (1973, Springer Verlag; chapter 'Irrigation Technology', pp. 303-353, for example overhead irrigation, canal irrigation, flooding, pivot irrigation; preferred are, however, those irrigation systems or irrigation methods which ensure irrigation of the soil or substrate underneath the edge of the plants' canopy, such as trickle irrigation or micro-sprinkler irrigation, which are known.

A particular advantage of the mixture M according to the invention is that it is readily dispersible (suspendible) for example in water, that is to say that the mixture according to the invention does not settle in the aqueous dispersion (suspension) within foreseeable periods and/or, for example, separates at the surface ("creaming"). A good measure for this dispersibility (suspendibility) is the suspension stability as defined in CIPAC MT 168 (CIPAC Handbook F—Page 427—Determination of Suspension Stability of Waterdispersible Granules). Usually, the suspension stability of the aqueous dispersions (suspensions) which comprise the mixture M according to the invention is 50 to 100%, preferably 70 to 100%.

The irrigation system according to the invention, preferably the trickle irrigation system, encompasses A) a storage container filled with the mixture M according to the invention, B) if appropriate a pump which supplies the pipeline system C), C) a pipeline system which is connected to the storage container at the inlet position and which supplies one or more D) trickle systems and/or sprinklers at the outlet positiont(s).

The plantations according to the invention encompass the useful plants and/or ornamentals, the soil and/or the substrate and the above-described irrigation system according to the invention, preferably trickle irrigation system, as essential components.

Suitable useful plants are arable crops such as cotton or cereals, but preferably fruit and vegetable plantings, preferably perennial plantings. Suitable ornamentals are potted plants and cut flowers, preferably perennial crops such as roses. Examples of fruit and vegetable plantings are: tomatoes, bell peppers, cucumbers, citrus fruit, bananas, peaches, dessert grapes, apples, pears, olives, mangoes, pawpaws, avocados, strawberries or kiwi fruit.

The method according to the invention and the devices according to the invention are distinguished in particular by the fact that the growth of the plants and their content of utilizable substances is increased in particular on alkaline soil under cultivation or volcanic soils, avoiding salinization of the soil in the process. The use of the mixture according to the invention promotes the growth of the plants more than when the constituents of the mixture M are applied by themselves (for example sulfur and sodium lignosulfonate in equal application rates. This effect manifests itself for example in the plant fresh-matter yield or in the iron and manganese content in the plant. This is in each case the result of a synergistic effect of the mixture M according to the invention, and the pH of the soil was not detectably altered by the treatment. It is furthermore surprising that the total salt content in the treated soil (determined by measuring the electrical conductivity) is markedly reduced. The mixture M according to the invention can be employed readily in irrigation systems, in particular for trickle irrigation. The medium can be pumped readily, inter alia because the ultrafinely particulate mixture M according to the invention is thoroughly dispersed/suspended in the aqueous mixture, and does not lead to blocking of the irrigation pipeline system or its nozzles or valves, as is the case for example in the case of coarsely-particulate suspended solids.

EXAMPLES

Synergism Sulfur—Sodium Lignosulfonate in the Fertigation of Plants

Experimental Set-Up: Container Experiment With Chinese Leaves

Combinations:
1. without addition
2. 8 mg S/pot/week
3. 80 mg S/pot/week
4. 2 mg sodium lignosulfonate/pot/week
5. 20 mg sodium lignosulfonate/pot/week
6. 10 mg mixture of 80% by weight sulfur and 20% by weight sodium lignosulfonate/pot/week
7. 100 mg mixture of 80% by weight sulfur and 20% by weight sodium lignosulfonate/pot/week Method:

Plant Species:
Chinese leaves "Kasumi", sown into P-soil in multi-cell trays, age at pricking out time into experimental containers: approx. 14 days; the same containers are planted twice.

Substrate:
Soil from Ruchheim, loam, pH 7.4, mixed with quartz sand (for retaining the structural stability during the container experiment).

Container:
PE pots/15, approx. 1 l substrate (1.5 kg).

Location:
Greenhouse, 25° C., supplementary lighting suitable for assimilation.

Fertilization:
Plant food 15+10+15+2 with trace elements without chelating agent (LAB 2411D; 0.5 g/container/week).

Irrigation:
Using a syringe and cannula into the soil at a depth of approx. 1 cm to simulate trickle irrigation conditions.
The additions were applied in one application weekly via the cannula. 10 mg of mixture M according to the invention/container/week correspond to approx. 5 kg/ha.

Results

Growth:
Growth promotion by increasing additions of lignosulfonate or of the mixture M according to the invention are observed, in particular in the first batch of plants. The addition of sulfur had no growth-promoting effect. The effect of the mixture M according to the invention tends to be superior to the effect of sodium lignosulfonate It was therefore necessary to test whether the effect of the mixture M according to the invention took the form of an additive effect of the two individual components or else of a synergistic effect. It can be seen clearly from the evaluation in table 1 that a synergistic effect was observed in each case, since the arithmetical growth performance to be expected ("expected") is always lower than the actual growth recorded.

Nutrient Contents:

The N, P, K and Mg contents were virtually not affected by the additional application of the components (table 2). In contrast, the contents in the trace elements iron (Fe) and manganese (Mn) increased markedly.

Again, a statistical check revealed that the increased contents were obtained by a synergistic effect of the individual components in the mixture M according to the invention (table 3).

Soil pH

The soil pH values were determined in soil samples which were taken firstly next to the trickier and secondly opposite. The sampling depth in the soil was approx. 3 cm, and the auger had a diameter of approx. 1 cm.

It can be seen from the list of the pH values in table 4 that the treatment had virtually no effect on the pH, both next to the trickier and opposite.

The results from the soil analysis which are compiled in table 5 show that the total salt contents in the soil are markedly reduced in virtually all of the samples owing to the use of the mixture M according to the inventions According to present-knowledge, a reduced salt content has a positive effect on plant growth since the water balance for the plant is improved. The decrease is particularly pronounced in the important top-most soil stratum, which is where most of the plant roots are located. The decreased salt content is also reflected in reduced concentrations of sodium ions, which are particularly harmful to plants and also sulfate ions in the soil water.

TABLE 1

Testing a synergistic effect of the mixture M (80% by weight sulfur + 20% by weight sodium lignosulfonate) on the growth of Chinese leaves

| Treatment | Fresh-matter yield g/container | % of untreated | Expected value (Colby) (E) | Reading (R) |
|---|---|---|---|---|
| Plant batch 1 | | | | |
| Untreated | 109 | 100 | — | — |
| Sulfur 8 mg | 106 | 97 | — | — |
| Lignosulfonate 2 mg | 112 | 103 | — | — |
| Mixture M 10 mg | 115 | 105 | 99 | 105 |
| Sulfur 80 mg | 108 | 99 | — | — |
| Lignosulfonate 20 mg | 117 | 104 | — | — |
| Mixture M 100 mg | 118 | 108 | 104 | 108 |
| Plant batch 2 | | | | |
| Untreated | 70 | 100 | — | — |
| Sulfur 8 mg | 67 | 96 | — | — |
| Lignosulfonate 2 mg | 76 | 108 | — | — |
| Mixture M 10 mg | 83 | 118 | 103 | 108 |
| Sulfur 80 mg | 68 | 97 | — | — |
| Lignosulfonate 20 mg | 79 | 112 | — | — |
| Mixture M 100 mg | 77 | 110 | 108 | 110 |

Expected value E < reading R = synergistic effect

TABLE 2

Mineral contents in leaves of Chinese leaves after application of the mixture M according to the invention (80% by weight sulfur + 20% by weight sodium lignosulfonate) and individual components

| Plant batch 1 | N | P | K | Mg | Mn | Fe |
|---|---|---|---|---|---|---|
| | | % in DM | | | ppm in DM | |
| Without | 3.76 | 0.48 | 4.45 | 0.25 | 65 | 110 |
| S 8 mg | 3.57 | 0.46 | 5.23 | 0.24 | 66 | 140 |
| S 80 mg | 3.86 | 0.50 | 5.57 | 0.25 | 67 | 174 |
| Lignosulfonate 2 mg | 3.60 | 0.45 | 4.09 | 0.23 | 64 | 129 |
| Lignosulfonate 20 mg | 3.64 | 0.44 | 4.05 | 0.23 | 59 | 94 |
| Mixture M 10 mg | 3.47 | 0.44 | 4.38 | 0.24 | 71 | 249 |
| Mixture M 100 mg | 3.69 | 0.50 | 4.47 | 0.26 | 91 | 255 |

TABLE 3

Testing a synergistic effect of the mixture M according to the invention (80% by weight sulfur + 20% by weight sodium lignosulfonate) on the iron and manganese contents in Chinese leaves (plant batch 1)

| Treatment | Content in ppm | % of untreated | Expected value (Colby) (E) | Reading (R) |
|---|---|---|---|---|
| Manganese | | | | |
| Untreated | 65 | 100 | — | — |
| Sulfur 8 mg | 66 | 101 | — | — |
| Lignosulfonate 2 mg | 64 | 99 | — | — |
| Mixture M 10 mg | 71 | 109 | 100 | 109 |
| Sulfur 80 mg | 67 | 103 | — | — |
| Lignosulfonate 20 mg | 59 | 91 | — | — |
| Mixture M 100 mg | 91 | 140 | 94 | 140 |
| Iron | | | | |
| Untreated | 110 | 100 | — | — |
| Sulfur 8 mg | 140 | 127 | — | — |
| Lignosulfonate 2 mg | 129 | 117 | — | — |
| Mixture M 10 mg | 249 | 226 | 149 | 226 |
| Sulfur 80 mg | 174 | 158 | — | — |
| Lignosulfonate 20 mg | 94 | 85 | — | — |
| Mixture M 100 mg | 255 | 231 | 134 | 231 |

Expected value E < reading R = synergistic effect

TABLE 4 pH values in the substrate with Chinese leaves after application of the mixture M according to the invention (80% by weight sulfur + 20% by weight sodium lignosulfonate) and individual components

| | pH | |
|---|---|---|
| | Next to trickler | Opposite trickler |
| After plant batch 1 | | |
| Untreated | 7.05 | 7.58 |
| Sulfur 8 mg | 7.11 | 7.66 |
| Lignosulfonate 2 mg | 7.14 | 7.73 |
| Mixture M 10 mg | 7.11 | 7.78 |
| Sulfur 80 mg | 7.18 | 7.76 |
| Lignosulfonate 20 mg | 7.18 | 7.78 |
| Mixture M 100 mg | 7.11 | 7.78 |
| After plant batch 2 | | |
| Sulfur 8 mg | 6.41 | 7.26 |
| Lignosulfonate 2 mg | 6.39 | 7.32 |
| Mixture M 10 mg | 6.29 | 7.21 |
| Sulfur 80 mg | 6.46 | 7.38 |
| Lignosulfonate 20 mg | 6.48 | 7.45 |
| Mischung M 100 mg | 6.39 | 7.44 |

TABLE 5

Salt contents in the soil at different depths after addition of the mixture M according to the invention (80% by weight sulfur + 20% by weight sodium lignosulfonate) in the fertigation during the growth period of tomatoes

| Date | Soil depth in cm | Salt content µS/cm* Mixture M without | Salt content µS/cm* Mixture M with | Na+ mg/l Mixture M without | Na+ mg/l Mixture M with | SO4− mg/l Mixture M without | SO4− mg/l Mixture M with |
|---|---|---|---|---|---|---|---|
| 16.10. | 30 | 17 210 | 8 890 | 808 | 538 | 1 899 | 1 214 |
|  | 60 | — | 10 400 | — | 840 | — | 2 440 |
| 30.10. | 30 | 6 180 | 3 980 | 534 | 424 | 1 357 | 1 072 |
|  | 60 | 7 400 | 7 910 | 623 | 554 | 1 860 | 1 590 |
| 13.11. | 30 | 5 160 | 3 380 | 529 | 380 | 1 637 | 1 104 |
|  | 60 | 4 780 | 4 590 | 524 | 738 | 1 172 | 1 460 |
| 28.11. | 30 | 3 470 | 2 760 | — | — | — | — |
|  | 60 | — | 7 820 | — | — | — | — |
| 16.12. | 30 | 3 560 | 3 100 | — | — | — | — |
|  | 60 | 4 340 | 3 980 | — | — | — | — |
| 29.12. | 30 | 4 340 | 3 230 | — | — | — | — |
|  | 60 | 3 940 | 3 600 | — | — | — | — |

*electrical conductivity

We claim:

1. A flowable mixture M for improving plant growth, wherein said mixture
    a) is in the form of water-dispersible granules;
    b) has a mean particle size of 50 µm to 4 mm;
    c) comprises 20-96% by weight of sulfur and 4 to 8% by weight of at least one complexing agent,
    and wherein said mixture M is dispersed in aqueous medium.

2. The mixture of claim 1, further containing at least one crop protection agent.

3. An irrigation system comprising
    A) a storage container containing a mixture M dispersed in aqueous medium, wherein said mixture M
        a) is in the form of water-dispersible granules;
        b) has a mean particle size of 50 µm to 4 mm; and
        c) comprises 20-96% by weight of sulfur and 4 to 8% by weight of at least one complexing agent,
    B) a pipeline system having an inlet and an outlet, the storage container connected to the inlet, and
    C) at least one trickle system and/or sprinkler connected to the outlet.

4. The irrigation system of claim 3, further including D) a pump operatively connected to the pipeline system.

5. A method for improving plant growth which comprises dispersing a flowable mixture M in aqueous medium and applying said dispersed mixture M by trickle irrigation to said plant or to soil or substrate in which the plant is located, wherein said mixture M
    a) is in the form of water-dispersible granules;
    b) has a mean particle size of 50 µm to 4 mm; and
    c) comprises 20-96% by weight of sulfur and 4 to 8% by weight of at least one complexing agent.

6. The method of claim 5, wherein the complexing agent is a polymeric complex-forming agent.

7. The method of claim 6, wherein the complexing agent is a lignosulfonate, a naphthalenesulfonic acid/formaldehyde condensate or a mixture thereof.

8. The method of claim 6, wherein the polymeric complex-forming agent is an alkali metal lignosulfonate and/or an alkaline earth metal lignosulfonate.

9. The method of claim 5, wherein the said or substrate is neutral to basic, and the mixture M is applied to the soil or substrate.

10. The method of claim 5, wherein the soil or substrate has a pH of 6.2 to 9.0.

11. The method of claim 10, wherein the pH is 7.0 to 8.2.

12. The method of claim 5, wherein the mixture M is dispersed in aqueous medium and the concentration of mixture M in the aqueous medium is 0.001 to 6% by weight, based on the total weight of the aqueous medium and the mixture M.

13. The method of claim 5, wherein the mixture M contains at least one crop protection agent.

14. The method of claim 13, wherein the crop protection agent is a herbicide, a pesticide, a fungicide or a mixture thereof.

15. The method of claim 5, wherein the mixture M contains at least one additive selected from the group consisting of water, a filler, a water softener, a plant nutrient, an anticaking agent, a soluble salt, a surfactant, an antiform agent and mixtures thereof.

16. The method of claim 5, wherein mixture M comprises 75 to 85% by weight of sulfur and 15 to 25% by weight of at least one lignosulfonate.

17. The method of claim 5, wherein the mixture M is applied at a total application rate of 50 to 5000 kg/ha per crop per season.

* * * * *

UNITED STATES PATENT AND TRADEMARK OFFICE
CERTIFICATE OF CORRECTION

PATENT NO. : 7,530,196 B2  Page 1 of 1
APPLICATION NO. : 10/499437
DATED : May 12, 2009
INVENTOR(S) : Tidow et al.

It is certified that error appears in the above-identified patent and that said Letters Patent is hereby corrected as shown below:

| Column | Line | Correction |
|---|---|---|
| 15 | 29 | Change "8%" to --80%-- |
| 15 | 40 | Change "8%" to --80%-- |
| 16 | 8 | Change "8%" to --80%-- |

Signed and Sealed this

First Day of September, 2009

David J. Kappos
*Director of the United States Patent and Trademark Office*